W. N. CAVILEER.
MECHANISM FOR WINDING LINES.
APPLICATION FILED AUG. 28, 1911.
1,030,770.
Patented June 25, 1912.
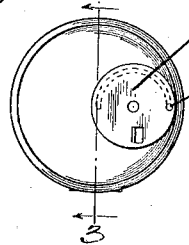
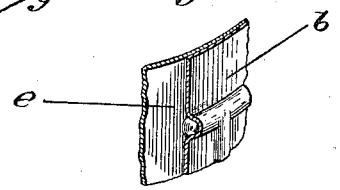
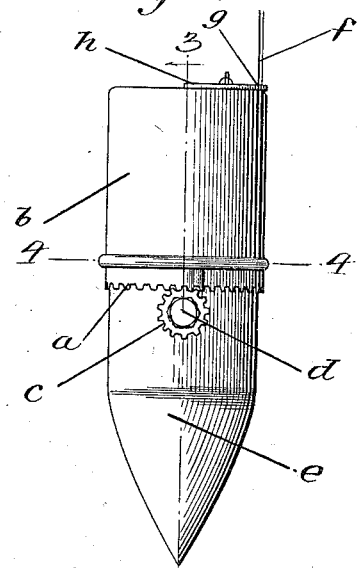
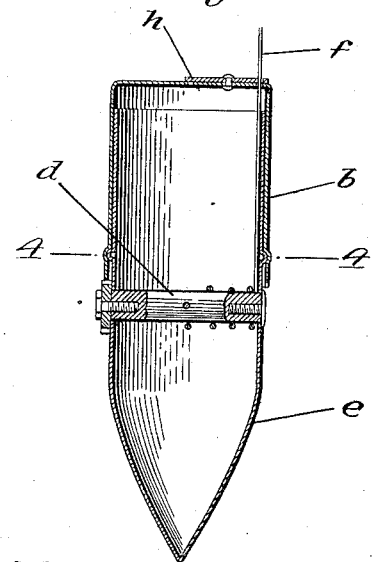
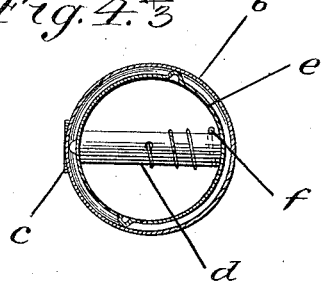
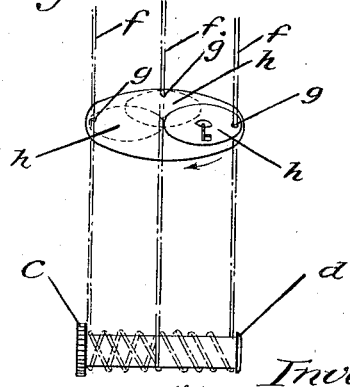
Witnesses:
Clarence J. Williams.
Semer G. Wells
Inventor
William N. Cavileer

UNITED STATES PATENT OFFICE.

WILLIAM N. CAVILEER, OF LOS ANGELES, CALIFORNIA.

MECHANISM FOR WINDING LINES.

1,030,770.　　　　　　Specification of Letters Patent.　　Patented June 25, 1912.

Application filed August 28, 1911. Serial No. 646,350.

*To all whom it may concern:*

Be it known that I, WILLIAM N. CAVILEER, citizen of the United States, residing at Los Angeles, in the county of Los Angeles and State of California, have invented certain new and useful Improvements in Mechanism for Winding Lines.

My invention relates to improvements in the method of winding lines.

The shaft or reel shown here has two motions: reciprocally, as it passes back and forth, and rotatable as it revolves, and if coloring powder is put in the holder, the line will be always chalked and ready for use when needed. For fishing purposes it is ideal, as the line will not be tangled on the reel. To accomplish this I employ a device illustrated in the accompanying drawings, in which—

Figure 1 is a top or plan view of the "line holder", showing the revolving disk with a hole for the line to pass through and a piece of the disk bent up to form a handle for the purpose of revolving the line around to the center of the top of the holder, so the device can be used as a plumb bob. Fig. 2 is a front view of the device, showing the geared edge of the upper half in mesh with the cog wheel on the end of the shaft rotatably mounted in the lower half of the holder. Fig. 3 represents a vertical sectional view of the holder showing how the shaft is mounted and secured by a set screw in each end. Fig. 4 is a section on line 4—4 of Fig. 3 showing the metal pressed out forming lugs on the exterior of the inner casing or lower half, and showing a correspondingly grooved band pressed in the upper half, in which the lugs slidingly engage, permitting the upper half to revolve axially upon the lower half, thereby imparting a multiple gear action to the shaft. Fig. 5 is a broken sectional view showing the inner casing with grooved passages for said lugs permitting them to engage rotatably the grooved band in the upper half. Fig. 6 is a diagram showing the upper section of the holder with a pivotally mounted disk with a hole in its outer edge for the line to pass through, and a shaft upon which the line winds reciprocally, my improved attachment, being shown with its parts in different operative positions.

When the two halves of the holder are turned in opposite directions the geared edge $a$ of the upper half $b$, running in mesh with the cog wheel $c$ on the end of the rotatable shaft $d$, mounted in the lower half $e$, the multiple gear $a$ and $c$ will cause the shaft $d$ to revolve rapidly and the line $f$ that is attached to said shaft $d$ will be wound up rotatably and reciprocally as the reel passes back and forth opposite the hole $g$ in the disk $h$ pivotally mounted on the top of the holder. The geared edge $a$ of the upper half $b$ resting on the cog wheel $c$ will act as a brake on the shaft $d$, when the line is being paid out, thereby preventing the line $f$ from unreeling too freely. In other words, the device will be adjustable. A mechanic holding the line in one hand by simply dropping the weighted end would cause the desired length to unreel, and if he wished to make vertical chalk line marks on a side wall, he would simply push the little disk around until the hole in the edge thereof was in the center of the holder, and if he had the holder filled with a colored powder of great specific gravity similar to red lead, the device would then become an adjustable plumb bob and chalk line holder.

Having thus described my invention, what I claim as new and patentable is:

1. In a line holder the combination of an inner casing provided with a gear actuated shaft rotatably mounted thereon, and an outer casing provided with a gear edge running in mesh with said gear actuated shaft when said outer casing is revolved axially around the inner casing; the top of said outer casing being provided with a pivotally mounted disk with a hole at its outer edge for a line to pass through, said disk being arranged to swing said line from the center of said casing to the outer edge, so when the inner and outer casing are revolved axially, the gears being in mesh, they will cause the shaft to revolve and wind up the line and traverse it across the shaft.

2. In a mechanism for winding lines the combination of a gear actuated shaft rotatably mounted in suitable bearings, and a cupped shaped casing with a gear edge and a disk with a hole in its outer edge for a line to pass through pivotally mounted on the top thereof, arranged to swing the line from the center of the top to its circumference, so when said gear edge is held in mesh with said gear actuated shaft and revolved, the line being in the outer edge of said top of said cupped shaped casing will cause the line to wind up rapidly and evenly as the shaft passes rotatably and reciprocally opposite the hole in the disk, all as shown and described.

3. An inner casing, a gear actuated shaft rotatably mounted therein, an outer casing with gear teeth cut in its lower edge to engage the gear on the shaft, said outer casing having a hole in one end and being axially mounted on the inner casing so that rotary movement of either casing will impart a rotary movement to the shaft on its center and a revoluble movement of the shaft on a horizontal plane with respect to the hole, as described.

In testimony whereof, I have hereunto affixed my signature in the presence of two subscribing witnesses.

WILLIAM N. CAVILEER.

Witnesses:
E. F. LUCEY,
URBAN EMME.

Copies of this patent may be obtained for five cents each, by addressing the "Commissioner of Patents, Washington, D. C."